United States Patent [19]
Morrison

[11] 4,039,032

[45] Aug. 2, 1977

[54] HOSE TRAINING MEANS

[75] Inventor: Ward D. Morrison, S. Acworth, N.H.

[73] Assignee: Joy Manufacturing Company, Pittsburgh, Pa.

[21] Appl. No.: 625,501

[22] Filed: Oct. 24, 1975

[51] Int. Cl.² .................................................. E21C 5/00
[52] U.S. Cl. ...................................... 173/43; 175/122; 137/355.17
[58] Field of Search ................... 173/53, 147, 160, 43, 173/152; 137/355.12, 355.16, 355.17, 355.18, 355.24

[56] References Cited

U.S. PATENT DOCUMENTS

| | | | |
|---|---|---|---|
| 3,162,253 | 12/1964 | Curtis | 173/147 |
| 3,500,941 | 3/1970 | Rudman | 173/160 |
| 3,508,619 | 4/1970 | Huffman | 173/160 X |
| 3,672,395 | 6/1972 | Fuetsch | 137/355.16 |
| 3,692,124 | 9/1972 | Kimber et al. | 173/160 |
| 3,907,043 | 9/1975 | Appleman | 175/62 |

*Primary Examiner*—Ernest R. Purser
*Assistant Examiner*—Richard E. Favreau
*Attorney, Agent, or Firm*—J. Stewart Brams

[57] ABSTRACT

This invention relates to conduit training means and more particularly an elongated, tensioned training means for training conduits in a predetermined path.

11 Claims, 6 Drawing Figures

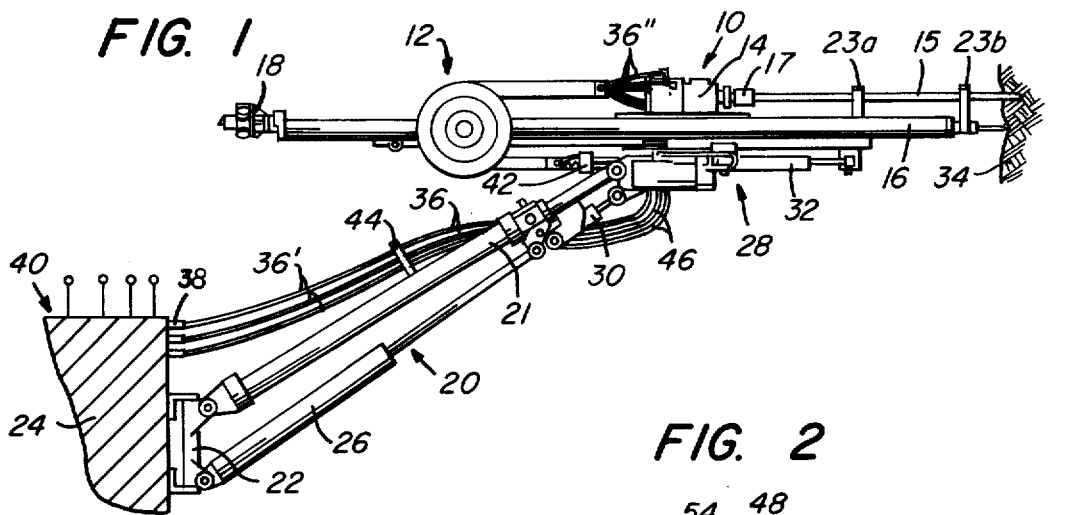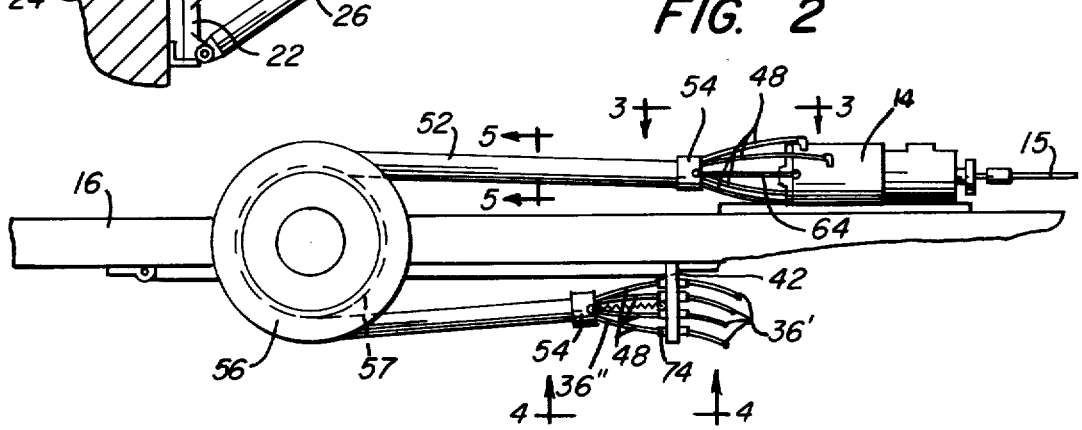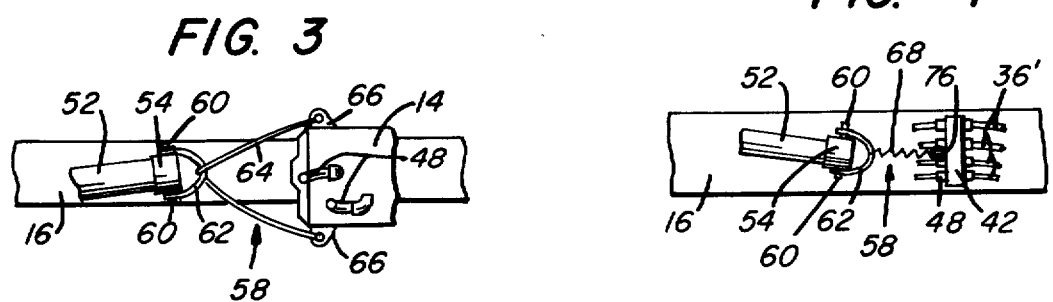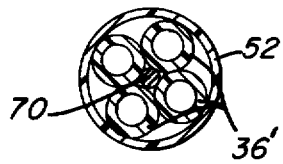

HOSE TRAINING MEANS

In the art of fluid actuated devices such as percussive rock hammers or drills it has been common practice to provide training means to control and position the various fluid hoses extending intermediate the drill and its fluid pressure source for purposes of operating convenience and safety. Prior hose training means have often been very rudimentary devices such as flexible bands wrapped about the hoses to bundle them together at selected points intermediate their ends and hanger means to suspend the bundled hoses adjacent the drill supporting structure. Of course, other more sophisticated hose training apparatus has on occasion been provided in the prior art. For example a traveling hose reel for use with a feedably mounted rock drill such as that disclosed in U. S. Pat. No. 3,500,941. Although these and other prior hose training means have generally served the purposes intended, they have nonetheless often been subject to certain serious deficiencies. For example, hose hanger or bundling devices often have not appreciably alleviated such difficulties as the imposition of excessive tension stress on the hoses, or hose binding, twisting and chafing. Furthermore, such devices have not eased the inherent hose handling difficulties of feedably mounted tools. Likewise, the known traveling reel devices, although somewhat useful in hose training for such feedable tools, often have not alleviated hose chafing, binding, twisting or stress problems. The present invention provides hose training means generally of the traveling reel or pulley type whereby these and other deficiencies of prior hose training devices are alleviated. To this end there is provided within the scope of the present invention means for encasing or bundling a plurality of fluid hoses or other elongated, flexible control conduits along substantially the entire length thereof whereby the hoses or conduits so encased are precluded from any undue binding or twisting, protected from chafing, and relieved of much of the tension stress which ordinarily might be imposed thereon. The present invention additionally provides for improved operator safety and convenience.

These and other objects and advantages of the present invention will become more readily apparent upon a reading of the following description in conjunction with the accompanying figures in which:

FIG. 1 is a side elevation of a fluid actuated rock drill and supporting structure therefor including hose training means of the present invention;

FIG. 2 is a fragmentary portion of FIG. 1 illustrating the hose training means of the invention;

FIG. 3 is a fragmentary top plan view of portion of FIG. 2 as seen from line 3—3 of FIG. 2 illustrating a tension bearing means for a hose training assembly;

FIG. 4 is a fragmentary portion of FIG. 2 as seen from line 4—4 of FIG. 2 illustrating another tension bearing means for a hose training assembly;

FIG. 5 is a transverse section taken on line 5—5 of FIG. 2 and illustrating a portion of still another tension bearing means for a hose training assembly;

Figure 6:
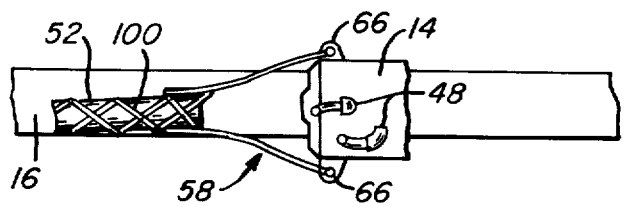
FIG. 6 is a view similar to FIG. 4 showing yet another tension bearing means for a hose training assembly.

There is generally indicated at 10 in FIG. 1 a fluid actuated rock drilling apparatus including hose training means 12 constructed according to the principles of the present invention. Of course it is to be understood from the outset that the illustrated drilling apparatus 10 is but one of numerous powered devices which may be adapted for use in conjunction with the present invention, and as such is not intended to unduly limit the scope of the invention described. Accordingly, as shown the apparatus 10 comprises any conventional rock drill 14 feedably mounted upon a feed frame 16 for controlled longitudinal movement therealong by any suitable means as for example a conventional feed screw means (not shown) powered by a feed motor 18 carried adjacent a rearward end portion of the frame 16. In practice the drill 14 is provided with a drill steel 15 supported and guided by a coupling 17 and centralizers 23a, 23b for drilling a hole in a formation such as a rock face 34 in the well known manner.

The frame 16 is adjustably supported for drilling operations in any suitable manner as by an extensible boom support structure 20. Inasmuch as such support structures are well known in the art, detailed description thereof is omitted herefrom. Let it suffice in this regard to note that the support 20 may commonly comprise a boom 21 universally pivotally affixed as at 22 to a base 24 such as a mobile crawler frame and including a suitable boom lift assembly 26 and an entirely similar boom swing assembly (not shown) for selective adjustment of the boom 21. Boom 21 carries feed frame 16 adjacent the forwardmost end thereof by means of a selectively adjustable support means 28 including a suitable feed frame tilt means 30 and swing means 32.

In practice suitable power means such as a conventional pressure fuid source (not shown) is provided to power the base 24 and the adjustable supports 20 and 28 for selective positioning of the drilling apparatus 10 prior to drilling a hole into the rock face 34 as described hereinabove. Accordingly, a plurality of flexible pressure fluid hoses 36 ordinarily will be provided to communicate between the drill 14 and such pressure fluid means for drill operation. For example percussion motor inlet and return lines, drill rotation motor inlet and return lines and a flushing fluid line may be provided, among others.

Each hose 36 comprises a first hose run 36' having one end thereof communicating with the fluid pressure source through a respective fluid connection as at 38 on a control and manifold means 40 carried by the base 24, and extending therefrom to a rigid junction and support plate 42 (FIG. 2) shown as being rigidly affixed adjacent an intermediate lower portion of the frame 16 and having the respective hoses 36' connected thereto. Of course additional hose supports may be provided such as at 44, and sufficient slack 46 is maintained in the hoses 36' to permit unrestricted adjustment of the support structure 20. As shown in FIG. 2 each respective hose 36 further comprises a second hose run 36" communicating adjacent one end thereof with the respective hose 36' by a fluid connection 74 through plate 42 and communicating adjacent the opposed end thereof with the respective fluid connection of the drill 14.

The hoses 36" are encased and bundled together intermediate respective end portions 48 thereof by a generally tubular elongated flexible sheath 52 fashioned from heavy woven fabric, for example, and resembling in its flexibility, strength and other physical properties a woven fabric fire hose. The sheath 52 ideally encases substantially the entire length of hoses 36" but may alternatively encase a shortened portion thereof, for example approximately half the length of hoses 36".

Sheath 52 includes circumferential clamping means 54 adjacent respective opposed ends thereof for clamping the sheath 52 about the hoses 36" adjacent the respective end portions 48.

As shown, the sheath 52 and hoses 36" encased thereby extend rearwardly of the drill 14, are reeved about a guide means shown as a traveling pulley or reel 56 having a circumferential guide trough 57 to receive the bundled hoses 36", and thence extend forwardly again to the connections 74 thereof at plate 42. The reel 56 is movably carried by frame 16 and suitably driven during drill operation longitudinally of frame 16 in the same direction as the feeding of drill 14 and at substantially one half the drill feed rate in any conventional manner, for example by means of a second feed screw assembly cooperable with the aforementioned drill feed screw as disclosed in the cited U.S. Pat. No. 3,500,941. It will be seen that by such arrangements the reel 56 always maintains the hoses 36" and encasing sheath 52 under complete control whereby drill operating convenience and safety are greatly enhanced. Additionally, the protection and control afforded by sheath 52 and the controlled feeding of the sheathed hoses 36" about reel 56 virtually eliminate hose binding, twisting and chafing problems.

Further refinements of the present invention are illustrated in FIGS. 3 and 4 wherein, for purposes of illustrative clarity, the hose end potions 48 as depicted in FIG. 2 are partially cut away. As shown in FIGS. 3 and 4 the end clamps 54 of sheath 52 are preferably provided with connector means 58 shown as comprising gudgeon pins 60 rigidly affixed to diametrically opposed portions of the respective clamps 54 and extending radially outwardly therefrom to captively and pivotally retain a generally U-shaped retention member 62. As shown in FIG. 3 the respective end portion of sheath 52 is retained with respect to drill 14 by any suitable connecting element, as for example a length of flexible and inextensible cable 64 which passes through the member 62 and has the respective end portions thereof secured to lugs 66 rigidly affixed to the casing of drill 14. It will be observed on reference to FIG. 2 that the length of cable 64 may be limited to provide a degree of slack in the hose end portions 48 whereby the hose connections to drill 14 may be relieved of substantially all mechanical tension stress thereon.

On reference to FIG. 4 it will be seen that the connector means 58 extending intermediate the clamp 54 and plate 42 is likewise comprised of gudgeon pins 60 rigidly affixed to the clamp 54 for captively pivotally retaining a generally U-shaped retention member 62. The connector element illustrated in FIG. 4 comprises a tension spring 68 communicating between member 62 and an eyelet 76 rigidly affixed to the plate 42. Spring 68 may normally be extended to a length slightly less than the respective hose end portions 48 whereby the portions 48 may be maintained somewhat slack (FIG. 2) and the connections thereof to plate 42 may be thus relieved of substantially all mechanical tension stress thereon. Furthermore, the extended condition of spring 68 will maintain a uniform tension, 150 pounds for example, in the sheath 52 and encased hoses.

It will of course be appreciated that the spring 68 is fully equivalent as a connector element to the cable 64 and hence could be used in place of cable 64 whereby resilient spring means would provide tensioning adjacent both ends of the sheath 52. Furthermore, it will be clear from the description hereinabove that the hoses 36" may be substantially free of mechanical tension stress at all times inasmuch as the sheath 52 and connectors 58 may be arranged to sustain virtually all applied tension loading. The inclusion of spring 68 and the slack in end portions 48 additionally provides for a degree of longitudinal adjustability whereby the hose training assembly 12 is able to compensate for such undesirable occurrences as, for example, the lodging of foreign matter in trough 57 between the reel 56 and sheath 52 reeved thereabout during operation. Without the spring 68 and slack in the corresponding end portions 48 such an occurrence would increase the effective radius of the trough 57 thereby greatly stressing the hoses 36" and the respective fluid connections thereof in tension and possibly causing serious damage or premature hose failure.

Although the preferred embodiment hereinabove is directed to a traveling reel hose training arrangement, the invention is not to be construed as being limited thereby inasmuch as alternative support arrangements are considered to be entirely within the scope of the invention. For example, the support arrangement may alternatively comprise a fixed, rotatable reel 56 (FIG. 2) having encased hoses 36" reeved thereabout intermediate the feedably carried drill 14 and a movable support 42 such that as drill 14 moves forward the plate 42 moves rearward to feed the hoses 36" about reel 56. Other comparable arrangements are also contemplated.

According to the description hereinabove there is provided by this invention novel means for positioning and training the fluid hoses associated with a feedably mounted tool. Notwithstanding the reference herein to a specific preferred embodiment of the invention it is to be realized that the invention may be practiced in numerous embodiments with various modifications thereto without departing from the broad spirit and scope thereof. For example: the drive for drill 14 and reel 56 could be a conventional orbiting chain drive or other suitable drive means; the sheath 52 might further comprise longitudinally extending closure means thereon for eased encasement of hoses 36" therein, the bundle of hoses 36" might additionally include such other control conduits as electrical cables; the connector means 58 adjacent respective ends of the sheath 52 might extend continuously through the sheath 52 as part of the bundle of conduits therein as shown at 70 in FIG. 5 whereby both the bundled hoses 36" and the sheath 52 would be relieved of substantially all mechanical tension stresses, or might be omitted entirely if excess tension stress in the hoses and hose connections is not considered a problem. The clamps 54 may be replaced by any suitable alternative structure such as a mesh type cable support grip as shown at 100 in FIG. 6; the cable 64 or equivalent connector elements could be employed adjacent both ends of the sheath 52 with a resilient element then being provided elsewhere as for example in a rearwardly spring biased resilient mounting for reel 56 or a spring biased mounting for the eyelet 76 on plate 42. These and other embodiments and modifications having been envisioned and anticipated by the inventor, it is respectfully submitted that the invention should be interpreted broadly and limited only by the scope of the claims appended hereto.

What is claimed is:

1. A powered apparatus comprising: an elongated guide frame; a power driven means carried by said guide frame and movable longitudinally thereon; conduit means cooperable with said power driven means for providing motive power thereto; at least a portion of said conduit means extending intermediate said power driven means and a support means spaced from said power driven means; elongated means defining an elongated path intermediate said power driven means and said support means and having opposed end portions thereof connected by connector means to said power driven means and said support means, respectively, to maintain said elongated means in uniform tension therebetween; said elongated means encompassing said portion of said conduit means along at least a major part of the length thereof; and guide means for guiding said elongated means within such a path.

2. A powered apparatus as claimed in claim 1 wherein the length of such path is less than the length of said portion of said conduit means.

3. A powered apparatus as claimed in claim 1 wherein said support means is movable cooperably with the movement of said power driven means along said guide frame.

4. A powered apparatus as claimed in claim 1 wherein said guide means is carried by said guide frame and is movable cooperably with the movement of said power driven means on said guide frame.

5. A powered apparatus as claimed in claim 4 wherein said guide means is a traveling reel.

6. A powered apparatus as claimed in claim 1 wherein said connector means includes a spring bias element adjacent at least one of said opposed end portions.

7. A powered apparatus as claimed in claim 6 wherein said connector means includes an inextensible tension bearing element.

8. A powered apparatus as claimed in claim 7 wherein said guide means is carried by said guide frame and is movable cooperably with the movement of said power driven means on said guide frame.

9. A powered apparatus as claimed in claim 7 additionally including circumferential clamping means surrounding said opposed end portions of said elongated means.

10. A powered apparatus as claimed in claim 9 wherein said inextensible tension bearing element and the respective one of said clamping means are respective tension bearing and clamping portions of a wire mesh hose grip.

11. A fluid operable rock drilling apparatus comprising: an elongated guide frame; a fluid operable rock drill carried by said guide frame and movable longitudinally thereon; fluid conduit means cooperable with said rock drill for providing motive fluid thereto; support means fixed to said guide frame at a location spaced from the path of movement of said rock drill; at least a portion of said fluid conduit means extending intermediate said rock drill and said support means; elongated means defining an elongated path intermediate said rock drill and said support means and encompassing said portion of said fluid conduit means along at least a major part of the length thereof; connector means for connecting opposed end portions of said elongated means to said support means and said rock drill, respectively, to maintain said elongated means in uniform tension; and guide means carried by said guide frame and movable cooperably with the movement of said rock drill along said guide frame to guide said elongated means within such a path.

* * * * *